United States Patent
Weiss et al.

[11] Patent Number: 6,112,057
[45] Date of Patent: Aug. 29, 2000

[54] CONFLICT RESOLUTION IN A MULTI-BEAM MULTI-SITE PAGING SYSTEM

[75] Inventors: Anthony J. Weiss, Tel Aviv; Yair Karmi, Rishon Lezion, both of Israel; Ilan Zorman; Haim Harel, both of Palo Alto, Calif.

[73] Assignee: Wireless Online, Inc., Los Altos, Calif.

[21] Appl. No.: 09/227,113

[22] Filed: Jan. 8, 1999

Related U.S. Application Data

[62] Division of application No. 08/971,596, Nov. 17, 1997, Pat. No. 6,016,421.

[51] Int. Cl.$^7$ ........................................... H04B 1/10
[52] U.S. Cl. ............................. 455/63; 455/67.3
[58] Field of Search .................... 455/422, 458, 455/501, 503, 512, 63, 67.3, 296, 59, 561, 150.1, 31.1, 31.2, 562; 340/825.44

[56] References Cited

U.S. PATENT DOCUMENTS

| | | | |
|---|---|---|---|
| 4,882,588 | 11/1989 | Renshaw et al. | 342/373 |
| 5,448,751 | 9/1995 | Takenaka et al. | |
| 5,648,784 | 7/1997 | Benedicto Ruiz et al. | 342/373 |

OTHER PUBLICATIONS

Balanis, C.A., in: Antenna Theory, Analysis and Design, Harper and Row, Inc., pp 679–685 and 698–699 (1982).

Mailloux, R.J., in: Phase Array Antenna Handbook, Artech House, Inc., pp 13–20, 438–445 and 521–524 (1994).

Motorola, Inc., Semiconductor Technical Data, FLEXchip Signal Processor, Publication No. MC68175/D 109 pages (1996).

Motorola, Inc., FLEXstack One Way Software Development Kit, Version 2.0, 66 pages (Dec. 13, 1996).

Motorola Inc., Flexible High Speed Paging Protocol Benchmarking, 16 pages (Apr. 26, 1994).

Motorola, Inc., FLEX Protocol's Operational Capabilities for Local, Regional, Nationwide and Global Roaming—Preliminary, 32 pages (Jul. 18, 1995).

Motorola, Inc., Typical FLEX Pager Block Diagram with FLEXstack, 1 page (Mar. 27, 1997) www.mot.com/SPS/DSP/flexchip/.

Texas Instruments TMS320FLEX1 Chipset Product Brief, 3 pages (Mar. 27, 1997) www/ti.com/sc/docs/wireless/page.htm.

Texas Instruments Press Release, "TI Chip Set Supporting FLEX Messaging Protocol Now Available" 2 pages (Nov. 11, 1996) www/ti.com/sc/docs/news/1996/96070.htm.

Texas Instruments TL V5591 Data Manual for FLEX Decoder, Appendix A and B, 22 pages (Apr. 17, 1996).

*Primary Examiner*—Reinhard J. Eisenzopf
*Assistant Examiner*—Marsha D. Banks-Harold
*Attorney, Agent, or Firm*—Townsend and Townsend and Crew LLP; Kenneth R. Allen

[57] ABSTRACT

Method and apparatus for resolving conflicts between the transmission or reception of disparate information over disparate beams transmitted or received by more than one base station. Simultaneous transmissions or receptions from a multiplicity of base stations carrying disparate messages on the same frequency are allowed. In certain pager-related embodiments, method and apparatus are provided for determining which subscriber units are accessible by any given beam, for determining the interference among beams, and/or for allocating transmission times for messages for various beams to support multiple simultaneous disparate transmissions or receptions, while ensuring that all subscriber units requiring service will get good quality of service in terms of signal to noise ratio, signal to interference ratio, and latency.

20 Claims, 3 Drawing Sheets

| | B1 | B2 | B3 | B4 | B5 | B6 | B7 | B8 | B9 |
|---|---|---|---|---|---|---|---|---|---|
| P1 | 3 | - | 8 | - | - | - | - | - | - |
| P6 | 7 | 9 | - | - | - | - | - | - | - |
| P8 | - | - | 10 | - | - | - | - | - | - |
| P11 | - | - | - | - | 5 | - | 9 | - | - |
| P15 | 4 | - | - | 9 | - | - | - | - | - |
| P18 | - | - | - | 6 | - | - | - | - | - |
| P21 | - | - | - | - | - | 4 | - | - | |

300

|     | B1  | B2 | B3 | B4 | B5 | B6 | B7 | B8 | B9 |
|-----|-----|----|----|----|----|----|----|----|----|
| B1  |     | +5 |    |    | 15 |    |    |    |    |
| B2  | −5  |    |    |    |    |    |    |    |    |
| B3  |     |    |    |    |    |    |    | 9  |    |
| B4  |     |    |    |    |    |    |    |    |    |
| B5  | −15 |    |    |    |    |    |    |    |    |
| B6  |     |    |    |    |    |    |    |    |    |
| B7  |     |    |    |    |    |    |    | −8 |    |
| B8  |     |    | −9 |    |    |    | 8  |    |    |
| B9  |     |    |    |    |    |    |    |    |    |

302

|     | S1  | S2 | S3 | S4 | S5 | S6 | S7 | S8 | S9 | S10 |
|-----|-----|----|----|----|----|----|----|----|----|-----|
| S1  |     | +5 |    |    | 15 |    |    |    |    |     |
| S2  | −5  |    |    |    |    |    |    |    |    |     |
| S3  |     |    |    |    |    |    |    | 9  |    |     |
| S4  |     |    |    |    |    |    |    |    |    |     |
| S5  | −15 |    |    |    |    |    |    |    |    |     |
| S6  |     |    |    |    |    |    |    |    |    |     |
| S7  |     |    |    |    |    |    |    |    |    |     |
| S8  |     |    | −9 |    |    |    |    |    | −8 |     |
| S9  |     |    |    |    |    |    |    | 8  |    |     |
| S10 |     |    |    |    |    |    |    |    |    |     |

CONFLICT RESOLUTION IN A MULTI-BEAM MULTI-SITE PAGING SYSTEM

This application is a division application of application Ser. No. 08/971,596 filed Nov. 17, 1997 now U.S. Pat. No. 6,016,421.

STATEMENT OF RELATED APPLICATIONS

The present application relates to the subject matter of four co-assigned applications: VERSATILE ANTENNA ARRAY FOR MULTIPLE PENCIL BEAMS AND EFFICIENT BEAM COMBINATIONS, application Ser. No. 08/808,347, MULTI-CHANNEL MULT-BEAM ENCODING SYSTEM, Attorney Docket No. 017994-000600, filed on May 22, 1997, METHOD AND APPARATUS FOR ADAPTING OMNIDIRECTIONAL SYNCHRONOUS WIRELESS COMMUNICATIONS PROTOCOL TO SECTORIAL ENVIRONMENTS, Attorney Docket No. 017994-000300, filed on May 22, 1997, and IMPROVED TWO-WAY PAGING UPLINK INFRASTRUCTURE, Attorney Docket No. 017994-000900. The contents of these co-assigned applications are herein incorporated by reference for all purposes.

BACKGROUND OF THE INVENTION

The present invention relates to pager networks and more particularly to scheduling of messages in a pager network.

Prior art pager networks include multiple omnidirectional transmission sites. In many regions, the coverage areas of multiple omnidirectional transmission sites overlap. The overlapping transmission sites operate in a simulcast fashion. When one transmission site transmits a message on a particular frequency, all transmission sites transmit the same message on that frequency.

This arrangement greatly limits message carrying capacity. Across an entire region, all transmitter sites may simultaneously transmit but a single message over any particular frequency.

The assignees of the present application have developed a paging system wherein each paging transmitter may transmit disparate messages simultaneously without conflict over a plurality of directional beams, rather than omnidirectionally. Other related patent applications include VERSATILE ANTENNA ARRAY FOR MULTIPLE PENCIL BEAMS AND EFFICIENT BEAM COMBINATIONS, application Ser. No. 08/808,34, MULTI-CHANNEL MULTI-BEAM ENCODING SYSTEM, Attorney Docket No. 017994-000600, filed on May 22, 1997, METHOD AND APPARATUS FOR ADAPTING OMNIDIRECTIONAL SYNCHRONOUS WIRELESS COMMUNICATIONS PROTOCOL TO SECTORIAL ENVIRONMENTS, Attorney Docket No. 017994-000300, filed on May 22, 1997. The contents of all of these applications is herein incorporated by reference.

Beams may conflict in this system. Adjacent beams of the same transmission site may conflict. Furthermore, to guarantee comprehensiveness of coverage, certain beams of one transmission site will necessarily overlap in coverage with beams of other transmission sites. Where beams conflict, simultaneous transmission of messages will become impossible.

Similar problems arise in the up-link portion of a two-way pager network that makes use of multiple reception beams received by multiple base stations. Simultaneous transmissions from subscriber units to one or more base stations may interfere with one another.

SUMMARY OF THE INVENTION

The present invention provides method and apparatus for resolving conflicts between the transmission or reception of disparate information over disparate beams transmitted or received by more than one base station. The present invention allows simultaneous transmissions or receptions from a multiplicity of base stations carrying disparate messages on the same frequency. In certain pager-related embodiments, method and apparatus are provided for determining which subscriber units are accessible by any given beam, for determining the interference among beams, and/or for allocating transmission times for messages for various beams to support multiple simultaneous disparate transmissions or receptions, while ensuring that all subscriber units requiring service will get good quality of service in terms of signal to noise ratio, signal to interference ratio, and latency.

In accordance with one aspect of the present invention, in a paging network wherein paging messages are transmitted to subscriber units via a plurality of transmission beams radiated from a plurality of transmitter sites, a method for scheduling message for transmission includes steps of: a) determining which ones of the plurality of transmission beams are usable to access which ones of the plurality of subscriber units, b) determining for each of the plurality of subscriber units which transmission beams interfere with one another, and c) scheduling messages for transmission by particular ones of the transmission beams based on which ones of the plurality of transmission beams are useable to access which ones of the plurality of subscriber units as determined in the a) step and based on which transmission beams interfere with one another as determined in the b) step, wherein interference between disparate transmissions by different ones of the transmission beams is avoided. Conflict between disparate transmissions by different ones of the transmission beams is avoided.

In accordance with another aspect of the present invention, in a paging network wherein paging messages are transmitted by subscriber units via a plurality of reception beams received by a plurality of receiver sites, a method for scheduling messages for transmission includes steps of a) determining which ones of said plurality of reception beams are usable to receive transmissions from which ones of said plurality of subscriber units, b) determining which ones of said plurality of subscriber units interfere with one another when transmitting simultaneously, and c) scheduling messages for transmission by particular ones of said subscriber units based on which ones of said plurality of reception beams are useable to receive transmissions from which ones of said plurality of subscriber units as determined in said a) step and based on interference between subscriber units as determined in said b) step. Interference among subscriber units is avoided.

A further understanding of the nature and advantages of the inventions herein may be realized by reference to the remaining portions of the specification and the attached drawings.

DESCRIPTION OF SPECIFIC EMBODIMENTS

Figures 1, 2:
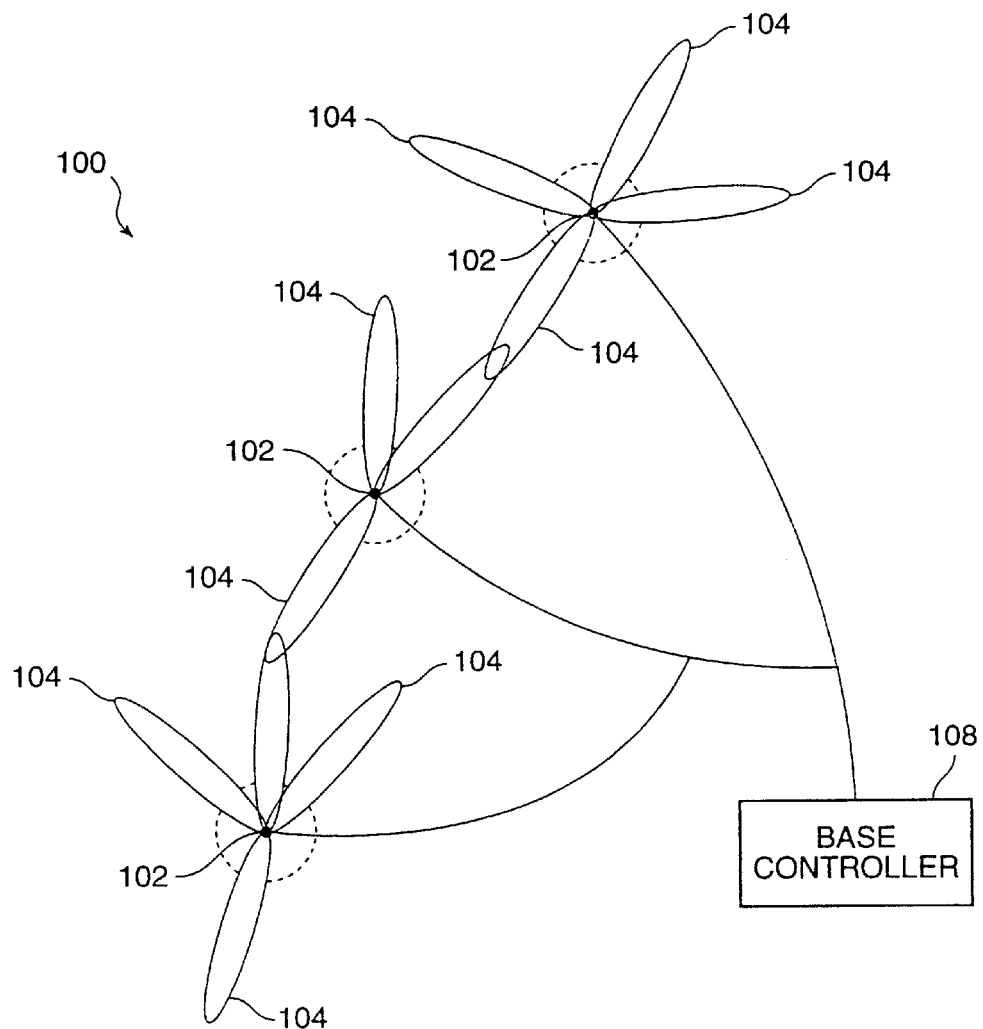
FIG. 1 is a diagram depicting a pager network employing multiple base stations and multiple beams according to one embodiment of the present invention.
FIG. 2 depicts a virtual location matrix for recording subscriber unit location according to one embodiment of the present invention.

FIG. 1 is a diagram depicting a pager network employing multiple base stations and multiple beams according to one embodiment of the present invention. A paging network 100 includes multiple base stations 102 at disparate transmission sites. Each base station radiates multiple transmission beams 104 in various directions. FIG. 1 depicts representative ones of the base stations, and for each base station, representative ones of the transmission beams. It is to be understood that paging network 100 may be a two-way paging network and that the pattern of transmission beams 104 may also represent a pattern of reception beams for receiving messages transmitted by subscriber units. The reception beam coverage pattern may or may not coincide with the transmission beam pattern.

The radiation patterns of the various transmission and/or reception beams are such that certain of the beams of the same base station do not substantially interfere with certain other beams. In a preferred embodiment, any two non-adjacent beams are usable to simultaneously carry disparate messages. On the down-link, a subscriber unit located in the coverage area of one of the non-adjacent beams may successfully receive the message on its beam without impairing interference from a message transmitted from the other beam. Similarly, on the up-link side, a subscriber unit located in the coverage area of one of the non-adjacent beams may successfully transmit a message on its beam without causing interference to a message transmitted by another subscriber unit located in the coverage area of the other beam. In this embodiment, adjacent beams may not carry different messages without interfering with one another. On the down-link side, a subscriber unit located in the intended coverage area of one of two adjacent transmission beams may receive a message successfully but if the other beam is actively transmitting a disparate message, communication may be impaired. Similarly, on the up-link side, subscriber units located in the coverage areas of adjacent reception beams may not simultaneously transmit disparate messages to the base station without interfering with one another.

To insure comprehensiveness of coverage over a given region, base stations 102 are spaced sufficiently close together that there is overlap in coverage between beams radiated from disparate base stations. Thus, in certain situations, beams radiated by disparate base stations may not carry different messages simultaneously without interfering with each other in areas of overlap of coverage.

Paging network 100 provides important advantages over the conventional prior art omnidirectional paging networks. In the prior art paging networks, each base station radiates omnidirectionally. All of the base stations in a given region broadcast the same message simultaneously on the same frequency, a process known as simulcasting. By contrast, paging network 100 allows for the possibility of simultaneous transmission of disparate messages to appropriately located subscriber units. Scheduling techniques according to the present invention help realize the capacity potential of paging network 100 by permitting multiple simultaneous disparate message transmission while avoiding conflict caused by overlap in beam coverage, either among beams at the same base station, or among beams radiated by disparate base stations.

According to the present invention, a regional controller 108 controls the transmission of all base stations and all beams within paging network 100. For the up-link portion of a two-way embodiment of paging network 100, regional controller 108 also controls the scheduling of transmission from subscriber units to base stations 102. The schedule information is transmitted via the down link from the various base stations 102 to the subscriber units so that the subscriber units know when to transmit.

Figures 3A, 3B, 4:
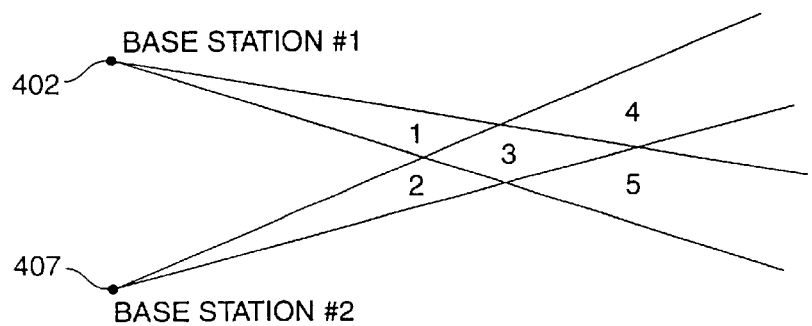
FIG. 3A depicts a down-link mutual interference matrix recording overlap between transmission beams according to one embodiment of the present invention.
FIG. 3B depicts an up-link mutual interference matrix recording interference between subscriber units according to one embodiment of the present invention.
FIG. 4 depicts overlaps in coverage between two transmission beams.

In order to avoid conflicting down-link transmissions, regional controller 108 maintains a down-link mutual interference matrix (MIM) for each subscriber unit as shown in FIG. 3A. The down-link mutual interference matrices shows the signal to interference ratio at the subscriber unit for any pair of beams, where one beam carries the desired signal and the other beam carries a different signal (interference). In order to avoid conflicting up-link transmissions, regional controller maintains an up-link mutual interference matrix for each reception beam as shown in FIG. 3B. The up-link mutual interference matrices shows for each pair of subscriber units, the signal to interence ratio as received by a particular beam, wherein one subscriber unit is transmitting a desired signal and another subscriber unit is transmitting an interference signal.

FIG. 2 depicts a virtual location matrix 200 for recording subscriber unit location according to one embodiment of the present invention. Virtual location matrix 200 may also be understood to be a coverage matrix. In operation, regional controller 108 maintains virtual location matrix 200 to assist in scheduling messages for transmission. Each column of matrix 200 corresponds to a particular transmission beam among the various transmission beams 104 of paging network 100. Each row corresponds to a subscriber unit. Each matrix entry represents the quality of service provided by a particular beam to a particular subscriber unit. Some entries are empty because certain beams cannot serve certain subscriber units. Virtual location is understood to be the assumed location base on measurements and does not necessarily coincide with geographical location.

In the preferred two-way embodiment of paging network 100 virtual location matrix 200 is obtained by noting the strength with which each subscriber unit may be received via the reception beam corresponding to any given transmission beam. From the strength and knowledge of transmitted power, a path loss between the subscriber unit and base station may be obtained. From the path loss, regional controller 108 may determine which beams are usable for transmissions to particular subscriber units and which beam are usable for reception from particular subscriber units.

The coverage of transmission beams does not necessarily coincide with the coverage of reception beams. If the coverages do not coincide, virtual location matrix 200 is obtained using direction finding techniques. In one such technique, each subscriber unit's transmitting signal strength is registered at two or more neighboring reception beams. The quality of service for a particular transmission beam used to transmit to a particular subscriber unit may be interpolated from the registered signal strength for the reception beams based on knowledge of the transmission beam pattern and reception beam pattern.

Another approach to filling in virtual location matrix 200 is based on direction finding (DF) measurements. A DF measurement provides a line of bearing (LOB). Hence, a DF measurement performed by a single base station provides a single LOB. A single LOB is considered a virtual location since it is enough to identify at least a single beam that can transmit to the subscriber unit.

The transmission beams which may access a subscriber unit are determined based on the virtual location. The signal to noise ratios for each transmission beam as received by each subscriber unit are also determined based on the virtual location. This information serves as the basis for the construction of virtual location matrix 200.

FIG. 3A depicts a down-link mutual interference matrix 300 recording overlap between transmission beams according to one embodiment of the present invention. There is a down-link mutual interference matrix 300 for each subscriber unit. The rows and columns correspond to the various beams. For each combination of two different beams, the table entry shows the signal to interference ratio at the particular subscriber unit. For example, referring now to down-link mutual interference matrix 300, when B2 is transmitting the desired signal, B1 will generate interference which is 5 dB below the desired signal. When B1 is transmitting the desired signal, B2 is generating interference which is 5 dB above the desired signal (an unacceptable level). The base station received signal strengths provide an indication of the signal strengths as received by each subscriber unit and thus are a basis for determining interference.

FIG. 3B depicts an up-link mutual interference matrix 302 recording interference between subscriber units for a particular reception beam. The rows and columns correspond to the various subscriber units. For each combination of two subscriber units, the table entry shows the signal to interference ratio as received via the particular reception beam.

Consider FIG. 4 which depicts the coverage of a first beam radiated by a base station 402 and a second beam radiated by a base station 404. To simplify depiction of the coverage areas it is assumed that for each beam the area for which sufficient signal strength is provided for adequate communication is identical to the area over which communication by other beams is disrupted. Both beams may be used simultaneously for transmission if the beam of base station 402 addresses subscriber units in regions 1 and/or 5 while the beam of base station 404 addresses subscriber units in regions 2 and/or 4.

It may be desirable to use both the beam radiated by base station 402 and base station 404 to simultaneously address subscriber units in region 3. This simulcast transmission may be beneficial if reception in region 3 is marginal and needs boosting.

The scheduling process takes as inputs the contents of virtual location matrix 200 and the priority levels of various messages. For down-link scheduling, the contents of the various down-link mutual interference matrices 300 are considered. For up-link scheduling, the contents of the various up-link mutual interference matrices 302 are considered. In the description that follows the priority level of a message is indicated by a positive integer number. The higher the priority, the lower the number. The priority of a message reflects its importance and the length of time it is waiting to be serviced. For example, messages with the highest priority, priority no. 1, may be very important messages, very short messages, or messages that have been waiting to be serviced more than two minutes.

Figure 5:
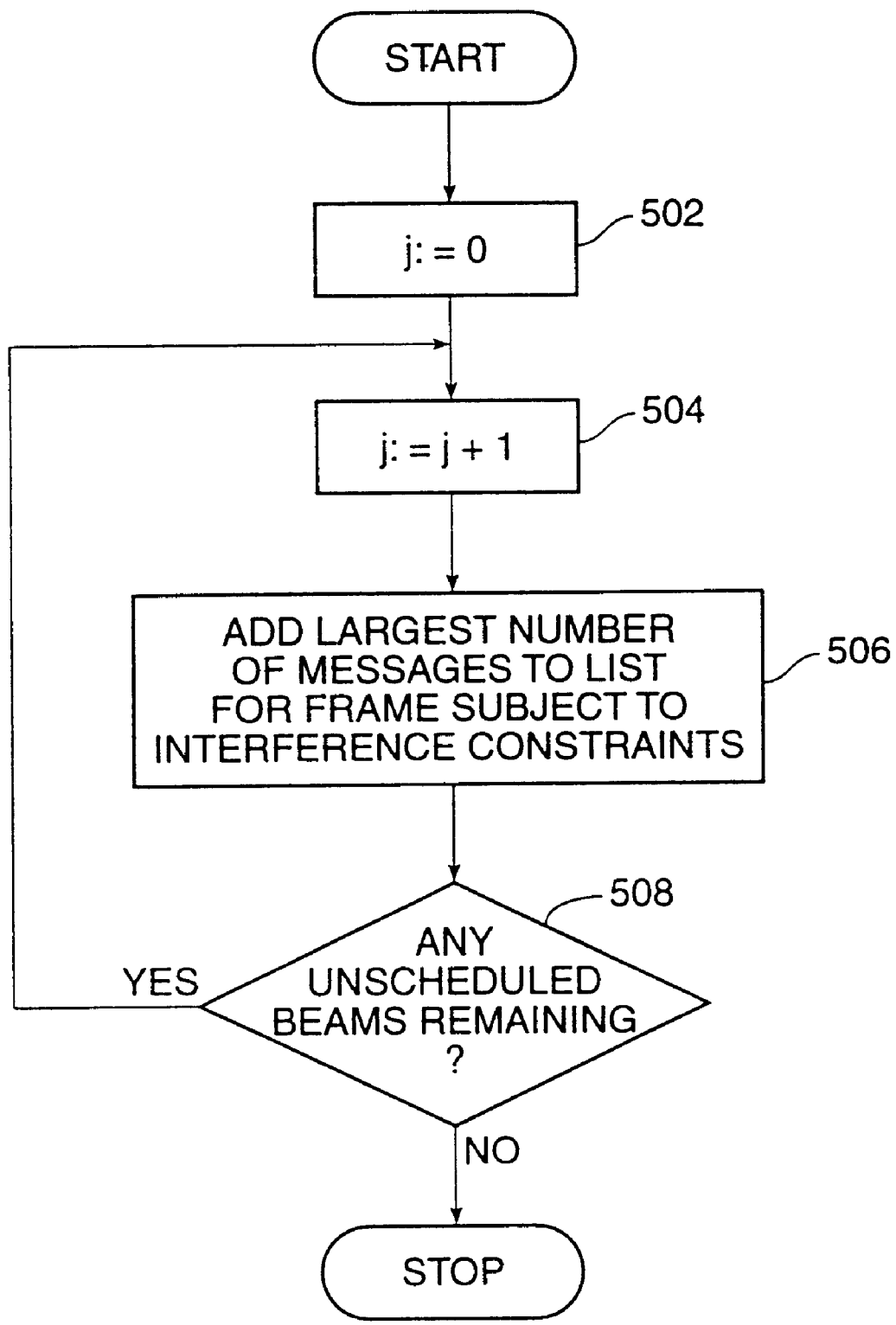
FIG. 5 is a flowchart describing steps of scheduling messages for simultaneous transmission according to one embodiment of the present invention.

FIG. 5 is a flowchart describing steps of scheduling messages for simultaneous transmission during one frame or block according to one embodiment of the present invention.

FIG. 5 applies to both up-link and down-link scheduling. At step 502, regional controller 108 sets a priority index, j to be equal to zero. At step 504, the priority index is incremented by one. At step 506, regional controller 108 adds messages having the current priority level to a list of messages to be simultaneously transmitted. Messages are added so as to maximize the number of messages on the list while observing the constraints of virtual location matrix 200 (only certain transmission beams may transmit to certain subscriber units) and for transmission, the down-link mutual interference matrices 300 that exist for the various subscriber units (certain transmission beams conflict with one another and may not transmit simultaneously.) For reception, the up-link mutual interference matrices 302 for each reception beam are considered instead. It should be noted that in determining interference as received by a subscriber unit, the received strengths of multiple beams carrying disparate transmissions should be summed. In determining the interference received by base stations 102, the contributions of multiple transmitting subscriber units should be summed. The set of messages to be added at step 506 is determined by exhaustive search or by a time-limited search over the possible combinations, considering the beams available to service each message.

At step 508, it is determined if any beams remain without messages to carry during the message transmission period. If one or more beams remain available, then the scheduling process returns to step 502 so that messages with lower priority, i.e., a higher priority index, may be added. If no more beams remain available, scheduling is complete for this frame.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. In a two-way paging network wherein paging messages are transmitted by subscriber units via a plurality of reception beams received by a plurality of receiver sites, a method for scheduling messages for transmission comprising the steps of:

a) determining which ones of said plurality of reception beams are usable to receive transmissions from which ones of said plurality of subscriber units, said reception beams, being simultaneously produced by receivers and directional antennas at each receiver site, and each said reception beam defining an angular sector of a region surrounding each receiver site;

b) determining which ones of said plurality of subscriber units interfere with one another when transmitting simultaneously; and c) scheduling messages for transmission by particular ones of said subscriber units based on which ones of said plurality of reception beams are useable to receive transmissions from which ones of said plurality of subscriber units as determined in said a) step and based on interference between subscriber units as determined in said b) step, wherein interference among subscriber units is avoided.

2. The method of claim 1 wherein said transmissions from said plurality of subscriber units are at a common frequency.

3. The method of claim 1 wherein said a) step comprises the substep of:

receiving an up-link message from a first subscriber unit via a first selected reception beam of a first receiver system located at a first selected transmission site, wherein transmissions from said first subscriber unit are determined to be receivable via a first selected reception beam radiated from said first selected transmission site and corresponding in coverage to said first selected reception beam.

4. The method of claim 3 wherein said a) step further comprises the substep of:

receiving an up-link message from said first subscriber unit via a second selected reception beam of a second receiver system located at a second selected transmission site, wherein said first subscriber unit is determined to be in a region accessible via both said first selected transmission beam and a second transmission beam radiated from said second selected transmission site and corresponding in coverage to said second selected reception beam.

5. The method of claim 1 wherein said scheduling step is further based on priority levels of said messages so as to schedule messages having higher priority levels for transmission sooner.

6. The method of claim 5 wherein said c) step comprises the substeps of:

c1) selecting messages having a given priority or greater that may be transmitted simultaneously by selected ones of said subscriber units without causing conflict due to interference as determined in said b) step; and c2) scheduling said selected messages for simultaneous transmission during a particular time period.

7. The method of claim 6 wherein said c) step further comprises the substep of:

c3) if reception beams of said plurality of reception beams remain available during said particular time period, lowering said given priority; and c4) repeating said c1) and c2) steps.

8. The method of claim 1 wherein said c) step comprises performing an exhaustive search of possible schedules.

9. The method of claim 1 wherein said c) step comprises performing a sub-optimal search of possible schedules.

10. The method of claim 1 wherein said a) step comprises determining that more than one reception beam is usable to receive transmissions from at least one of said subscriber units.

11. In a two-way paging network wherein paging messages are transmitted by subscriber units via a plurality of reception beams received by a plurality of receiver sites, a regional controller that schedules messages for trasmission by the steps of:

a) determining which ones of said plurality of reception beams are usable to receive transmissions from which ones of said plurality of subscriber units, said reception beams being simultaneously produced by receivers and directional antennas at each receiver site, and each said reception beam defining an angular sector of a region surrounding each receiver site;

b) determining which ones of said plurality of subscriber units interfere with one another when transmitting simultaneously; and c) scheduling messages for transmission by particular ones of said subscriber units based on which ones of said plurality of reception beams are useable to receive transmissions from which ones of said plurality of subscriber units as determined in said a) step and based on interference between subscriber units as determined in said b) step, wherein interference among subscriber units is avoided.

12. The regional controller of claim 11 wherein said transmissions from said plurality of subscriber units are at a common frequency.

13. The regional controller of claim 11 wherein said a) step comprises the substep of:

receiving an up-link message from a first subscriber unit via a first selected reception beam of a first receiver system located at a first selected transmission site, wherein transmissions from said first subscriber unit are determined to be receivable via a first selected reception beam radiated from said first selected transmission site and corresponding in coverage to said first selected reception beam.

14. The regional controller of claim 13 wherein said a) step further comprises the substep of:

receiving an up-link message from said first subscriber unit via a second selected reception beam of a second receiver system located at a second selected transmission site, wherein said first subscriber unit is determined to be in a region accessible via both said first selected transmission beam and a second transmission beam radiated from said second selected transmission site and corresponding in coverage to said second selected reception beam.

15. The regional controller of claim 11 wherein said scheduling step is further based on priority levels of said messages so as to schedule messages having higher priority levels for transmission sooner.

16. The regional controller of claim 15 wherein said c) step comprises the substeps of:

c1) selecting messages having a given priority or greater that may be transmitted simultaneously by selected ones of said subscriber units without causing conflict due to interference as determined in said b) step; and c2) scheduling said selected messages for simultaneous transmission during a particular time period.

17. The regional controller of claim 16 wherein said c) step further comprises the substep of:

c3) if reception beams of said plurality of reception beams remain available during said particular time period, lowering said given priority; and c4) repeating said c1) and c2) steps.

18. The regional controller of claim 11 wherein said c) step comprises performing an exhaustive search of possible schedules.

19. The regional controller of claim 11 wherein said c) step comprises performing a sub-optimal search of possible schedules.

20. The regional controller of claim 11 wherein said a) step comprises determining that more than one reception beam is usable to receive transmissions from at least one of said subscriber units.

* * * * *